(12) United States Patent
Reynaud et al.

(10) Patent No.: US 9,386,502 B2
(45) Date of Patent: Jul. 5, 2016

(54) ROUTING ADAPTABLE TO ELECTROMAGNETIC CONDITIONS IN A MULTIHOP NETWORK

(75) Inventors: Laurent Reynaud, Trevou-Treguignec (FR); Yvon Gourhant, Lannion (FR)

(73) Assignee: Orange, Paris (FR)

( * ) Notice: Subject to any disclaimer, the term of this patent is extended or adjusted under 35 U.S.C. 154(b) by 223 days.

(21) Appl. No.: 13/056,207

(22) PCT Filed: Jul. 3, 2009

(86) PCT No.: PCT/FR2009/051303
§ 371 (c)(1), (2), (4) Date: Jan. 27, 2011

(87) PCT Pub. No.: WO2010/012926
PCT Pub. Date: Feb. 4, 2010

(65) Prior Publication Data
US 2011/0128884 A1 Jun. 2, 2011

(30) Foreign Application Priority Data
Jul. 29, 2008 (FR) ..................... 08 55204

(51) Int. Cl.
*H04W 40/16* (2009.01)
*H04W 40/24* (2009.01)
*H04W 40/18* (2009.01)

(52) U.S. Cl.
CPC .............. *H04W 40/16* (2013.01); *H04W 40/18* (2013.01); *H04W 40/24* (2013.01); *H04W 40/244* (2013.01)

(58) Field of Classification Search
None
See application file for complete search history.

(56) References Cited

U.S. PATENT DOCUMENTS

| | | | |
|---|---|---|---|
| 2003/0120809 A1 | 6/2003 | Bellur et al. | |
| 2004/0028003 A1* | 2/2004 | Diener et al. | 370/319 |
| 2004/0185851 A1* | 9/2004 | Nagai | 455/436 |
| 2005/0026617 A1* | 2/2005 | Okuyama | 455/436 |
| 2005/0159111 A1* | 7/2005 | Kim et al. | 455/67.14 |
| 2005/0186912 A1* | 8/2005 | Nakao et al. | 455/67.11 |
| 2005/0197127 A1* | 9/2005 | Nakasaku | H04W 40/12 455/445 |
| 2006/0098603 A1* | 5/2006 | Cave et al. | 370/335 |
| 2006/0234720 A1* | 10/2006 | Takizawa et al. | 455/453 |
| 2007/0101015 A1* | 5/2007 | Larsson et al. | 709/238 |
| 2008/0009279 A1* | 1/2008 | Sakawa | 455/423 |
| 2008/0076450 A1* | 3/2008 | Nanda et al. | 455/456.1 |
| 2009/0143064 A1* | 6/2009 | Bernini et al. | 455/423 |
| 2010/0226276 A1* | 9/2010 | Sampath et al. | 370/252 |

FOREIGN PATENT DOCUMENTS

WO WO 2004/077746 A1 9/2004
WO WO 2006/075942 A1 7/2006

* cited by examiner

*Primary Examiner* — Joshua A Kading
(74) *Attorney, Agent, or Firm* — Drinker Biddle & Reath LLP

(57) ABSTRACT

A method for routing in a multihop network comprises, for at least one multihop network node: a/ obtaining a value of an electromagnetic field near said node; b/ predetermining a ratio between said obtained value and a predefined electromagnetic field threshold value; c/ using the predetermined ratio to optionally select said node as a routing node for at least one message in the multihop network.

15 Claims, 7 Drawing Sheets

ROUTING ADAPTABLE TO ELECTROMAGNETIC CONDITIONS IN A MULTIHOP NETWORK

CROSS-REFERENCE TO RELATED APPLICATIONS

This application is the U.S. national phase of the International Patent Application No. PCT/FR2009/051303 filed Jul. 3, 2009, which claims the benefit of French Application No. 08 55204 filed Jul. 29, 2008, the entire content of which is incorporated herein by reference.

FIELD OF THE INVENTION

The invention relates to the field of routing in a multihop network, that is to say a network in which at least some of the terminals act as nodes through which messages can pass.

BACKGROUND

Thus a message transmitted by a first node, called the source, to a second node, called the destination, remote from the first node, can pass through a third node constituted by a terminal of the network. A routing protocol adapted to the network is used for determining this possible third node, as well as the other possible nodes through which the message passes.

From among multihop networks, it is possible to mention the mesh networks, for example WiFi mesh networks, and the Ad Hoc networks. The latter can implement wireless communications and comprise relatively mobile nodes.

Certain routing protocols, called proactive, provide for each node of the network to keep updated a routing table and to broadcast control data in order to estimate the topology of the network. It is for example possible to refer to OLSR (Optimized Link State Routing) and TBRPF (Topology Broadcast Based on Reverse-Path Forwarding).

Other routing protocols, called reactive, provide for a generation of paths between the source node and the destination node only when requested by the source node. It is possible to refer to AODV (Ad hoc On-Demand Distance Vector Routing) and DSR (Dynamic Source Routing).

It is well known that the transmission of digital data, whether by wire or wireless, generates an electromagnetic field. When a geographic zone is subjected to a relatively powerful electromagnetic field, on the one hand the effects on the other surrounding transmissions (interference) and, on the other hand, the presumed effects on the health of the persons in the neighbourhood of this zone can be feared.

Recommendations, for example the recommendations of ICNIRP (International Commission on Non-Ionizing Radiation Protection) in association with WHO, or also the decisions of ARCEP (Autorité de Régulation des Communications Electroniques et des Postes) in France, fix transmitted power limit values. These limit values depend, among other things, on the zone of use (for example for the decisions of ARCEP, Metropolitan France or other French territory), on the location of the use (inside or outside of buildings) and on the frequency band used.

There is a need, during the routing of a message in a multihop network, to limit the zones for which the power of the electric and/or magnetic fields is relatively high, or at least to know these zones.

SUMMARY

The invention responds to this need by proposing, according to a first aspect, a method for routing in a multihop network, comprising, for at least one node of the multihop network:

a/ obtaining an electromagnetic field value in a neighbourhood of this node, b/ determining a ratio between said obtained value and a predefined electromagnetic field threshold value ($E_M$, $B_M$), c/ selection or not of said node as a routing node for at least one message in the multihop network according to the determined ratio.

Thus the routing is carried out taking account of an electromagnetic field (i.e. electric and/or magnetic) value by comparison with an electromagnetic field threshold value in a neighbourhood of one or more nodes. It is thus possible to distribute the nodes used for the routing of the messages in such a way as to avoid or minimize the number of zones for which the power of the electric and/or magnetic fields is relatively high and more precisely exceeds the threshold value.

This method therefore makes it possible to carry out a routing that is adaptable to the electric and/or magnetic field conditions in a neighbourhood of the stations forming a multihop network. The invention can have diverse and varying applications, for example in the field of the domestic wireless networks, medical hospital networks and networks of the "health care" type used in a medical environment.

The method according to an aspect of the invention can in particular allow the setting up of data routing on routes of the network that suffer little interference, or on routes that have to generate little electromagnetic interference (for example, in the context of a domestic network, a route which would pass close to a child's bedroom), and to achieve this in a relatively simple manner.

The method according to an aspect of the invention can allow better control of the electromagnetic compatibility (EMC) with surrounding items of equipment. The use of a wireless terminal is in fact likely to have an electromagnetic effect on surrounding devices, in particular in the context of hospital medical networks, or networks of the "health care" type used in medical environments.

The method can also make it possible to limit or at least to better control the electromagnetic incidence on living tissues created by the wireless network itself or created by the overall environment around the wireless network, in particular for domestic wireless networks or networks of the 'health care' type.

The method of the invention can also make it possible to have an overall and cumulative estimation of electromagnetic interference of a given environment, in a given set of given frequency bands, whether this interference is created by the nodes themselves or by devices outside of the network in question.

The term "message" here refers to a set of data forming a block transmitted in a network. According to the context, a message can be called a frame, a data packet or another expression of this type.

The multihop network can in particular be an Ad Hoc network or a mesh network.

The multihop network can be a wireless or a wired network. For example, the messages can be conveyed by Ethernet or by a power line communication (PLC) technology. In particular, multihop networks can be heterogeneous, that is to say that at least some of the nodes are likely to include communication interfaces of different natures, for example Wifi and Ethernet, or Ethernet and PLC, or also WIFI and BLUETOOTH (registered trademark) (techniques for exchanging data over short distances).

In the case of a heterogeneous network, the proposed method can result in choosing one of the available interfaces for a given node.

The neighbourhood of a node is generally understood to be all of the neighbours of the node, that is to say all of the nodes which are in direct communication with the node in question. In other words, the neighbourhood of a node comprises all of the nodes which, in order to access the node in question, do not need to pass through one or more intermediate nodes.

However, "magnetic field value in the neighbourhood of a node", in the context of step a/, is also understood to be the value of the field at the level of the node itself as well as the value of this field in the geographic zone to which the node belongs, such as the zone defined by the joining of various radio range zones of the wireless interfaces of the node whose neighbourhood is considered. It is recalled that the radio range zone is generally defined by a disk whose radius is the maximum range of a radio communication interface. This radius is also called the transmission radius.

During stage c/, the determined ratio is used for selecting or not selecting the node as a message routing node. This stage can for example be carried out according to a reactive routing protocol: the node receives a request message, for example a RREQ (Route REQest) message, and responds to it favourably or unfavourably according to the value obtained in stage a/. In this embodiment, stages a/ b/ and c/ are thus implemented by a single node.

The invention is not of course limited by the routing mode used. For example, it is possible to provide for stage c/ to be carried out according to a proactive routing protocol: a given node transmits the ratio determined in stage b/ to neighbouring nodes for the purpose of updating routing tables, and these neighbouring nodes decide whether or not to send messages to this given node for the purpose of passing on to other nodes depending on the transmitted value of the electric and/or magnetic field in the neighbourhood of this given node. In this embodiment, stages a/, b/ and c/ are then implemented by several nodes of the multihop network.

The magnetic and/or electric field whose value is obtained in stage a/ can result solely from the transmission of messages in the multihop network. That is to say that the determination of the value of this field takes account only of the effects of the transmission of messages in the multihop network.

Alternatively, the field whose value is obtained in stage a/ can result from the transmission of messages in the multihop network and other factors, in particular related to the environment of the node, such as for example the transmission of other data on other networks, the functioning of an item of household equipment (such as an iron or a microwave oven) close to the node, or other. The invention is not limited by the nature of the value obtained in stage a/, provided that the latter refers to an electromagnetic field. For example, this value can comprise an electromagnetic power, for example in Watts, a power density in Watts per square meter, a magnetic flux density, for example in Teslas, or also in Amperes per meter (Flux density $\vec{H}$) and/or an electric field intensity, for example in Volts per meter, or other.

The value obtained in stage a/ can be relative to certain frequencies only. For example, an electromagnetic field power is measured in a given frequency band, for example 2.4 GHz-5 GHz.

Alternatively, the value obtained in stage a/ can take account of all the frequency components of the spectrum, that is to say in particular this value can take account of frequencies other than the operating frequencies of the communication interfaces, for example of the dc components of the electric and/or magnetic field, of the components at 50-60 Hz, and other components.

Thus, the method according to an aspect of the invention can make it possible to choose routes avoiding areas particularly interfered with from the electromagnetic point of view.

The obtaining stage a/ can be carried out on the basis of a measurement of the value of an electric and/or magnetic field, such that the value obtained can be relatively accurate.

The invention is not limited by the type of sensor used for carrying out this measurement.

This measurement can be carried out in the neighbourhood of the node, for example by means of a sensor integrated in the casing of the node, which allows a particularly reliable measurement. The sensor can optionally be separate from the node, whilst being connected to the node by a wired link for example, provided that this sensor makes it possible to measure an electric and/or magnetic field value in the neighbourhood of the node.

Alternatively, this measurement can be carried out by one or more remote sensors, belonging for example to a network of sensors separate from the multihop network.

The method according to an embodiment of the invention can comprise, for at least one remote sensor, a stage of reception of an electric and/or magnetic field measurement in the neighbourhood of this sensor, the received measurement originating from this sensor. The value of the electric and/or magnetic field in the neighbourhood of the node is evaluated from this or these received measurements.

Equipping each node with a sensor is avoided in this way. It is in particular possible to use a network of sensors of the type of the networks of sensors used for measuring the temperature or the quality of air. The installation of these networks can be relatively simple and inexpensive.

Moreover, in the case of failure of a sensor, it can remain possible to estimate the field values in the neighbourhood of the nodes by using the measurements obtained from the other sensors.

Each field measurement in the neighbourhood of a sensor can be received directly from this sensor, such that the node receives only the measurements from sensors communicating directly with the node without passing through another node (this therefore refers to sensors situated one hop from the node). It is therefore possible to make an assumption from the pertinence of the measurements received in order to estimate the field value in the neighbourhood of the node.

Alternatively, a field measurement in the neighbourhood of a sensor can be received indirectly from this sensor, by passing, for example, via another sensor or via another node.

The node can receive, in addition to the measured values, information on the location of the corresponding sensors, for example an absolute position or relative to the position of the node. These items of location information can be taken into account during the calculations for evaluation of the electric and/or magnetic field in the neighbourhood of the node. Moreover, these items of location information can make it possible to eliminate the measured values originating from sensors considered to be too distant from the node.

In fact it is possible to provide for receiving a plurality of electric and/or magnetic field measurements in the neighbourhood of a plurality of respective sensors, and to select from this plurality of received measurements those measurements considered pertinent, for example measurements corresponding to sensors relatively close to the node. The electric and/or magnetic field value in the neighbourhood of the node is evaluated from the selected measurements.

For example, this selection can be carried out by the node, by using criteria of the type distance between node and sensor (to be compared, for example, with a predetermined maximum value), number of hops between node and sensor, presence of measurements in the frequency band, or other.

It is possible for the measurements to be received from a gateway device providing the interconnection between the multihop network of the nodes and the network of sensors, optionally following a request originating from the node.

The gateway can broadcast to all the nodes of a set of nodes the measurements received from all of the sensors of a set of sensors. This is then called flooding. Each node chooses from among the received measurements those that it considers pertinent for the evaluation of the field in the neighbourhood of the node. This choice can be made using, for example, a distance criterion; in this case, the node receives with each measurement an item of location information of the sensor corresponding to this measurement.

Alternatively, the gateway can choose to transmit to a given node only the measurements considered pertinent for the evaluation of the field in the neighbourhood of this node. It is then the gateway which selects from a plurality of measurements the measurements considered pertinent for the estimation of a field value in the neighbourhood of the node. It is possible to provide for the node to transmit to the gateway an item of information relating to its own location, upon which the gateway bases itself in order to select the measurements.

According to yet another embodiment, the obtaining stage a/ can be carried out from a prediction of electromagnetic field value. This prediction can be carried out from at least one contextual parameter, for example pre-engineering knowledge. A good practice aid server having consultant software can for example be used. Such a server is arranged for predicting, on the basis of contextual parameters, an electromagnetic field value in a given place. The contextual parameters can comprise expected contextual data, for example information of expected traffic as a function of time or information on the expected use of items of household equipment. The contextual parameters can comprise measured contextual data, for example information on the measurement of the number of items of household equipment currently in use. This embodiment can be used without electromagnetic field sensors.

According to yet another embodiment, a metric value is estimated on the basis of the electromagnetic field value obtained in stage a/, an electromagnetic field value obtained previously and the predefined electromagnetic field value threshold and, during stage c/, said metric value is used for selecting or not selecting said node as a routing node for at least one message in the multihop network.

According to yet another embodiment, the metric value is estimated as follows:

$$c_t = \frac{1}{\alpha \cdot M_t + (1-\alpha) \cdot M_{t-1}},$$

where $c_t$ is the metric value, $0 < \alpha \leq 1$, $$M_t = \max\left(\frac{E_t}{E_M}, \frac{B_t}{B_M}\right), \ et \ M_{t-1} = \max\left(\frac{E_{t-1}}{E_M}, \frac{B_{t-1}}{B_M}\right)$$

where $E_M$ and $B_M$ are predetermined values,
$E_t$ is an electric field value obtained in stage a/,
and $E_{t-1}$ is a previously obtained electric field value,
$B_t$ is a magnetic field value obtained in stage a/, and
and $B_{t-1}$ is a previously obtained magnetic field value.

According to yet another embodiment, for each candidate route of a set of at least one candidate route, a route parameter is determined from the metric values of the nodes of said candidate route, and the route parameters thus determined are compared in order to choose one route from among the candidate routes. According to the invention, for each candidate route, the route parameter is determined using a concave law of composition of metric values.

According to another aspect, there is proposed a computer program comprising instructions for the implementation of the routing method described above, when these instructions are executed by a processor.

According to another aspect, there is proposed a recording medium which can be read by a computer and on which a computer program such as described above is recorded.

According to another aspect, there is proposed a system for routing in a multihop network, comprising, for at least one node of the network, means of obtaining an electromagnetic field value in a neighbourhood of this node, means of determination of a ratio between said obtained value and a predefined electromagnetic field threshold value, as well as means of choosing a route arranged for using the determined ratio for selecting or not selecting the node as a routing node for at least one message in the multihop network.

This system can comprise several devices, for example several nodes of the network. It is for example possible to provide for the means of obtaining an electromagnetic field value to include sensors for carrying out the electric and/or magnetic field measurements as well as, possibly, a gateway device for communicating with the nodes. It is also possible to provide for the obtaining means to comprise means of communication with sensors or with a gateway device. It is also possible to provide for the obtaining means to comprise a device for the prediction of electric and/or magnetic field values, for example a good practice aid server, and/or means of communication with such a device.

According to yet another aspect, a node for a multihop network is proposed, this node comprising the means of obtaining an electromagnetic field value in a neighbourhood of this node, means of determination of a ratio between said obtained value and a predefined electromagnetic field threshold value and means of choosing a route arranged for using the ratio determined by the obtaining means in order to select or not select itself as a routing node for at least one message in the multihop network.

According to yet another aspect, there is proposed a communication terminal forming a node of a multihop network such as described previously.

BRIEF DESCRIPTION OF THE DRAWINGS

Other features and advantages of the present invention will appear in the following detailed description, given with reference to the appended drawings in which.

Identical references indicate identical or similar objects from one figure to another.

DETAILED DESCRIPTION

Figure 1:
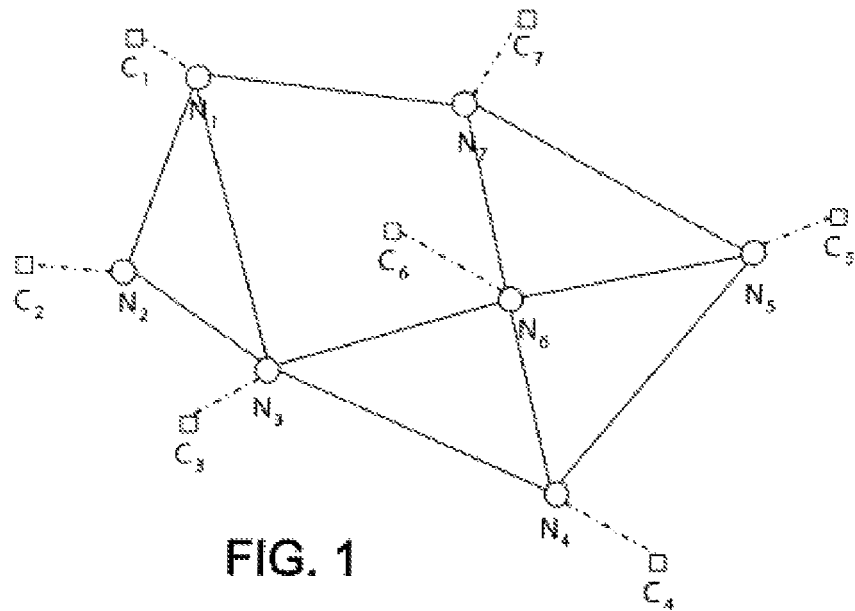
FIG. 1 shows an example of a part of a multihop network comprising a routing system according to a first embodiment of the invention.
Figure 2:
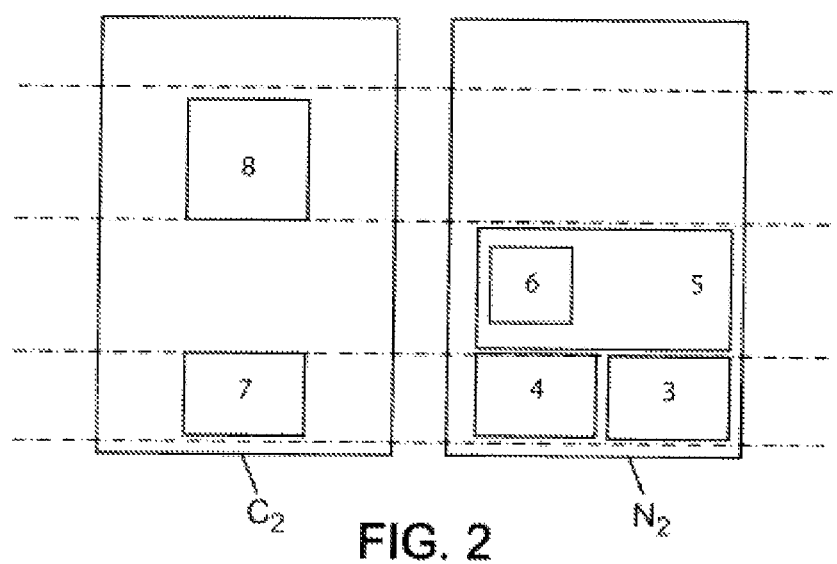
FIG. 2 shows an example of a routing system according to the first embodiment of the invention.

FIGS. 1 and 2 relate to a first embodiment of the invention, in which measurements of electric and/or magnetic field values are carried out directly in the neighbourhood of the nodes of the network. During the choice of a route, these measured values are used for selecting or not selecting a node as a message routing node in the multihop network.

Reference is firstly made to FIG. 1, which shows an example of a part of a multihop network comprising a routing system according to a first embodiment of the invention.

Each terminal or node $N_1, N_2, \ldots, N_7$, of the part of the network shown is connected, by a wired or wireless communication link, to a respective sensor $C_1, C_2, \ldots, C_7$. Such an electromagnetic sensor can be directly integrated in the node, or situated close to this node.

The communications between the different nodes $N_1, N_2, \ldots, N_7$, are carried out by wired or wireless communication links. The multihop network can be for example a wireless multihop mesh network or a wireless multihop ad hoc network. It can be a heterogeneous network in which, for example, certain nodes are connected by wired links and others by wireless links.

FIG. 2 shows in a functional manner an example of a routing system according to the first embodiment of the invention. The different components 3, 4, 5, 6, 7 and 8 are positioned according to their function: thus the components 3, 4, 7 provide interface functions, the components 5, 6 provide routing functions and the component 8 provides an application function.

The node $N_2$ is a communication terminal comprising an interface 3 for communication with the other nodes of the network. This interface can be wireless or wired, for example Ethernet 802.3. From the examples of usable wireless technology it is possible to mention, for example, 802.11a/b/g/n, BLUETOOTH (registered trademark) (techniques for exchanging data over short distances), UWB (Ultra Wide Band).

The part of network composed of the set of nodes $N_1, N_2, \ldots, N_7$ can depend on a single type of communication interface, such as the node $N_2$ of FIG. 2, or on several types of communication interfaces. In this latter case, the network is referred to as a heterogeneous multihop network.

The node $N_2$ comprises moreover route choosing means 5, in this case a multihop routing component suitable for routing control and data packets on the communication interface 3 of the node $N_2$.

The routing component 5 can implement a proactive Ad Hoc routing protocol of the OLSR, TBRPF or other type, a reactive Ad Hoc protocol of the AODV DSR, or other type. The component 5 can alternatively implement a hybrid Ad Hoc routing protocol, adopting a proactive or reactive approach depending on the context. For example a ZRP (Zone Routing protocol) protocol can be used. Alternatively, the routing component 5 can implement a so-called "not flat" or hierarchic or other protocol.

The component 5 comprises means of estimation 6 of an electric and/or magnetic field metric. The estimation of this metric is described with reference to FIG. 3, described in detail below.

The component 5 is capable of choosing a route according to the estimated electric and/or magnetic field metric.

In particular, there are routing protocols aimed at supporting Quality of Service or QoS, for example INSIGNIA or BRuIT (Bandwidth Reservation under Interference influence). It is also possible to refer to work on taking interference into account in order to improve quality of service for proactive protocols, in particular the article by D. Q. Nguyen and P. Minet, 'Interference-aware QoS for mobile ad-hoc network routing', ACTS-IEEE int. Workshop on Self-Assembling Wireless Networks, SAWN'05, Towson, Md., May 2005, for the case of an OLSR protocol.

These protocols make it possible to take account of delay or bandwidth metrics in the choice of a route. The component 5 can be arranged according to such a routing protocol aimed at supporting quality of service, except that the metric used is the electric and/or magnetic field metric estimated by the means 6.

The sensor $C_2$ is linked with the node $N_2$ by means of a wired or wireless link. The sensor $C_2$ and the node $N_2$ comprise interface devices 7, 4 respectively to provide communication between the sensor $C_2$ and the node $N_2$. A sensor directly integrated in the node can also be provided.

The sensor $C_2$ comprises a device 8 for measuring electric and/or magnetic field, for example a simple mono-axial electromagnetic field sensor or even a tri-axial field sensor making it possible to carry out measurements without the intervention of an operator.

The electromagnetic field conditions defined by the pair (E, B) representing at a time t, the intensities of the electric field $\vec{E}$ and of the magnetic field $\vec{B}$ are measured by the component 8 in one or more given and predefined frequency bands.

Figure 3:
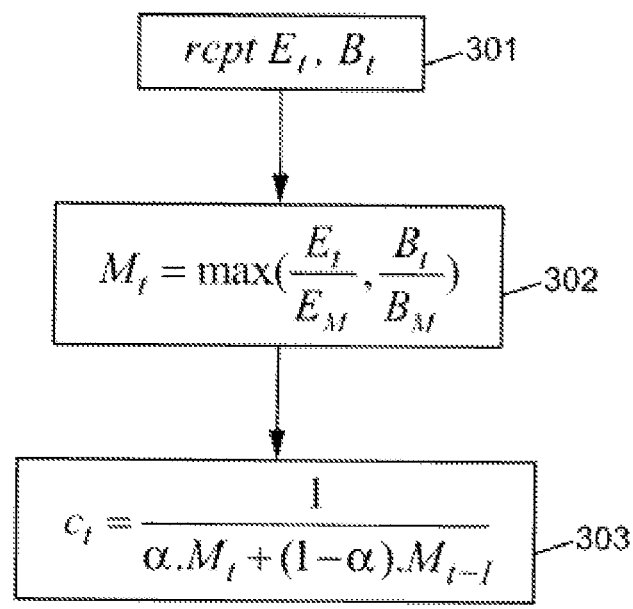
FIG. 3 is a flowchart of an example of a method executable by a computer program according to an embodiment of the invention.

FIG. 3 is a flowchart representing an example of a method executable by the estimation means 6.

The sensor 8 carries out the measurements of the electric field and of the magnetic field at regular intervals in a given frequency band.

During a stage 301, the estimation means 6, for example a processor or a part of a processor, receive an electric field value $E_t$ in the given frequency band and a magnetic field value $B_t$ in the given frequency band.

A value $M_t$ is determined during a stage 302 as follows:

$$M_t = \max\left(\frac{E_t}{E_M}, \frac{B_t}{B_M}\right),$$

where $E_M$ and $B_M$ are threshold values of the electric field and of the magnetic field respectively over the frequency band in question, typically maximum values tolerated by a given standard. This standard can be for example be given by decree N° 2002-775, that is to say $E_M$=61 V/m and $B_M$=0.2 µT, in the frequency band 2.4 GHz-5 GHz. Thus the value $M_t$ represents a ratio between a value of the electromagnetic field and an electromagnetic field threshold value.

A metric $c_t$ is then estimated during a stage 303, using a value $M_{t-1}$ previously estimated from the values $E_{t-1}$ and $B_{t-1}$, received at the time indexed t−1, and retained in memory:

$$c_t = \frac{1}{\alpha \cdot M_t + (1-\alpha) \cdot M_{t-1}},$$

where $0 < \alpha \leq 1$.

If the sensor used allows only the measurement the electric field intensity $\vec{E}$ (or respectively of the magnetic flux density $\vec{B}$), $B_t$ (or respectively $E_t$) is assumed to be zero at any time t. In these two cases, the equations of the stages 302 and 303 remain valid.

The metric $c_t$, referring to the node $N_2$, is updated after each measurement by the sensor 8. It is a strictly positive and non-normalized value.

If $c_t \leq 1$, then the electromagnetic field conditions around the sensor 8 are outside of the limit levels authorized and/or recommended by the given standard.

If $c_t > 1$, then the electromagnetic field conditions around the sensor 8 comply with the limit levels authorized and/or recommended by the given standard. If $c_1$ is large compared with 1, few electromagnetic field effects around the sensor are to be foreseen in the frequency band in question.

The node $N_2$ can broadcast the value $c_t$ to other nodes of the network. The choice of the routes can be carried out based on the metric values $c_t$ of several nodes of the network. For example, for each route candidate, a route parameter is determined from the metric values $c_t$ for the nodes of this route candidate. For example, the values of the metrics $c_t$ of the nodes of this route are added or multiplied, and the route candidate chosen is the one for which the resultant sum or product is highest.

In particular, the standard path selection algorithms, such as Dijkstra, Bellman-Ford, and their variants, remain usable.

Advantageously, rather than a sum or a product, a concave law of composition of the metric values $c_t$ will be chosen for determining the route parameters. In fact, it is pertinent to choose a route for which no node has a metric $c_t$ of value lower than a threshold. The threshold can be equal to 1, which corresponds to the authorized or recommended limits of the electric and/or magnetic field values. The threshold can be strictly higher than 1.

The broadcasting in the multihop network of the metric values c, and the taking into account of these metric values in choosing a route can conform to the rules defined in a routing protocol aimed at supporting the quality of service, except that the metric used is the electric and/or magnetic field metric $c_t$.

FIGS. 4A to 4E illustrate an example of choice of a route in the multihop network of FIG. 2. In this example, a reactive Ad Hoc protocol DSR, taking account of the quality of service, is conformed with except that the metric used is the metric $c_t$, and not a conventionally used quality of service metric, such as for example a delay or bandwidth metric.

Unless otherwise specified in the present description of FIGS. 4A to 4E, the protocol described conforms to the experimental RFC 4728, 'The Dynamic Source Routing protocol (DSR) for Mobile Ad Hoc Networks for IPv4'. To this default functioning is added the possibility for each node to maintain the metric value $c_t$ locally and to take account of this value during the relay of any control packet.

Figure 4A:
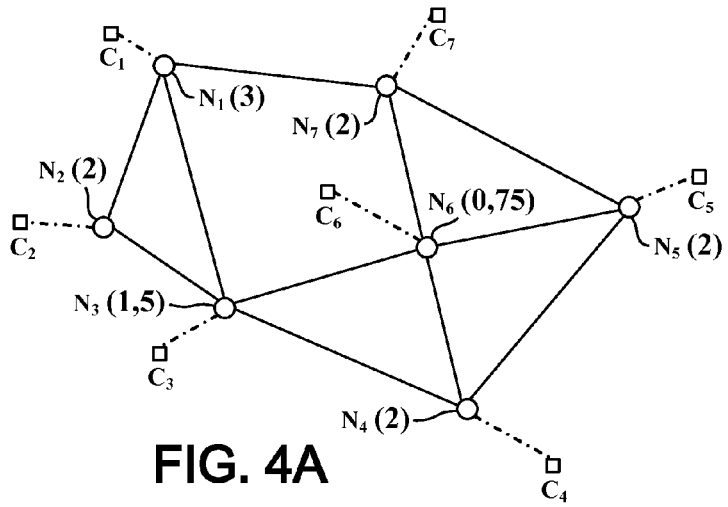
FIGS. 4A to 4E illustrate an example of choice of a route in the multihop network shown in FIG. 2.
Figure 4B:
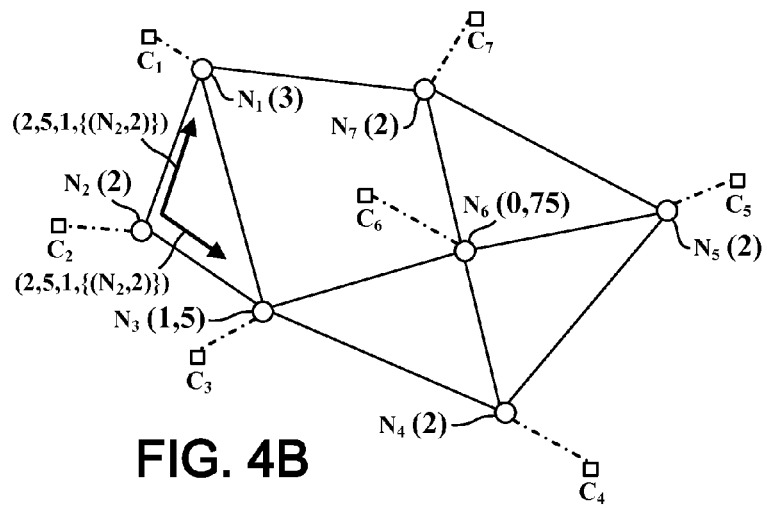

Each node retains the metric value $c_t$, also called EMFC (Electro-Magnetic Field Conditions), such as shown in FIG. 4A. For example, a metric value $c_t = 0.75$ corresponds to the node $N_6$, that is to say that the electric and/or magnetic field is relatively strong in the neighbourhood of this node $N_6$.

In the example shown, the node $N_2$ wishes to determine a route to the node $N_5$. The node $N_2$ broadcasts a control message of the RouteRequest type indicating a request to find a route to the node $N_5$. The RouteRequest packet contains a structure of the type $\{S, D, EMFC_{min}, L\}$ containing the references of the source (S) and destination (D) nodes, the minimum value of the EMFC metric accepted for each node of the route to be constructed, and a list L of the nodes through which the packed has passed.

The list L contains moreover the EMFC values associated with each of the nodes in this list at the time the RouteRequest message passed through these nodes. In the example illustrated by FIG. 4B, the node $N_2$ sends a RouteRequest message containing the structure $(2.5, 1, \{(N_2, 2)\})$, indicating that the message comes from the node $N_2$, its destination is the node $N_5$, imposes a minimum value of the EMFC metric $c_t = 1$ for each node of the route to be constructed, and has passed through the node $N_2$ which had as an EMFC value $c_t(N_2, t) = 2$ at the time t that this node was passed through.

Figure 4C:
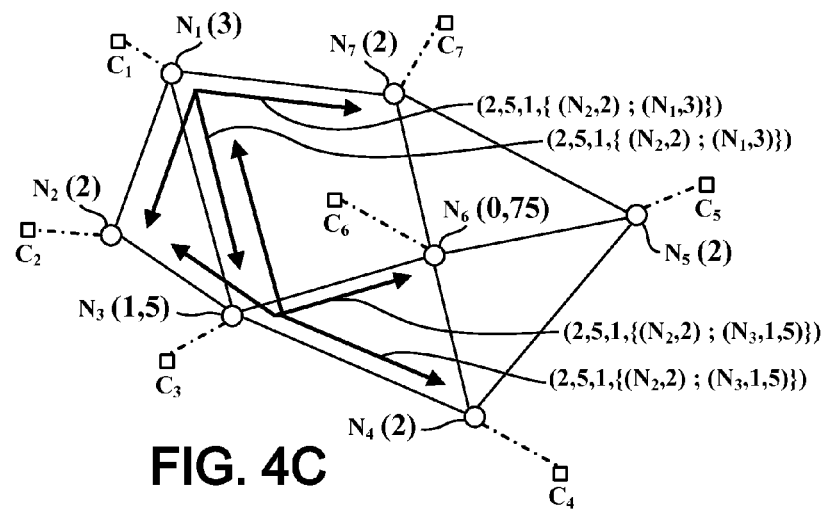

The RouteRequest message is received by the nodes $N_1$ and $N_3$ within the transmission range of this message. The node $N_1$ analyses the RouteRequest message and checks its capability of relaying this message whilst following the default rules of the DSR specification. Moreover, the node $N_1$ checks that the EMFC value measured in the neighbourhood of the node $N_1$ substantially at the time when the RouteRequest message passes through this node $N_1$ is higher than the minimum EMFC value imposed in the RouteRequest message itself. In this instance, for the node $N_1$, $c_t = 3$, which is well above the threshold $EMFC_{min} = 1$. $N_1$ therefore propagates the RouteRequest message, adding itself to the list of nodes passed through. In other words, the node $N_1$ broadcasts the RouteRequest message containing a structure of the type $(2.5, 1, \{(N_2, 2); (N_1, 3)\})$, such as shown in FIG. 4C.

Similarly, the node $N_3$ broadcasts the RouteRequest message, this time containing a structure of the type $(2.5, 1, \{(N_2, 2); (N_3, 1.5)\})$.

Figure 4D:
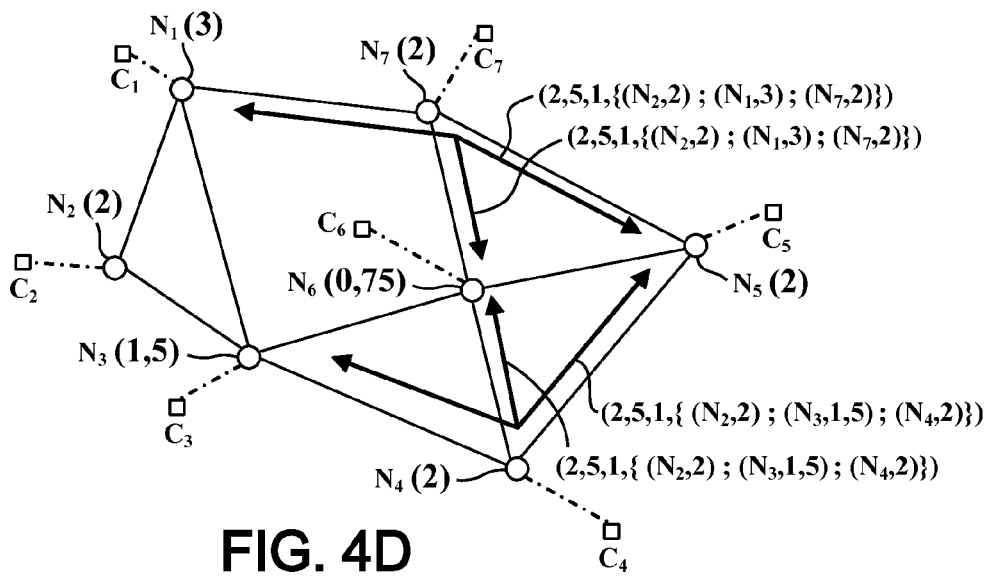

The node $N_6$ receives a RouteRequest message originating from $N_3$. $N_6$, in accordance with the default rules of the DSR protocol, should broadcast this message. However, the value of the metric $c_t$ corresponding to this node is 0.75, that is to say a value lower than the minimum threshold value of 1. The node $N_6$ therefore abstains from broadcasting this RouteRequest message, as illustrated in FIG. 4D.

The node $N_7$ receives a RouteRequest message originating from $N_1$, which complies with the default rules of the DSR protocol. The metric value $c_t$ corresponding to this node $N_7$ is 2, that is to say a value higher than the minimum threshold of 1. The node $N_7$ therefore broadcasts a RouteRequest message containing the structure $(2.5, 1, \{(N_2, 2); (N_1, 3); (N_7, 2)\})$.

Similarly, the node $N_4$ receives a RouteRequest message originating from $N_3$, and therefore broadcasts a RouteRequest message containing the structure $(2.5, 1, \{(N_2, 2); (N_3, 1.5); (N_4, 2)\})$.

The destination node $N_5$ receives the two RouteRequest type messages originating from $N_7$ and $N_4$ respectively. These two messages are both valid with regard to the basic rules of DSR.

The node $N_5$ chooses the path that is shortest in number of nodes. In case of a plurality of shorter paths, the best path can be determined by searching, for each shorter path, for the lowest value of the metric $c_t$ among the nodes of this path, and by choosing the path for which this value is the highest.

Figure 4E:
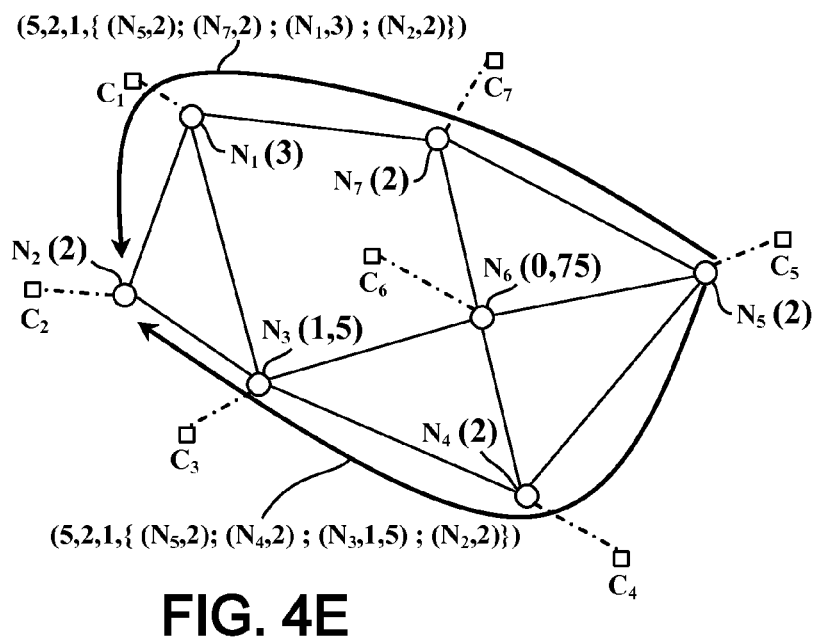

Taking the example of FIG. 4E, it would be the path passing through the nodes $N_1$ and $N_7$ which would be chosen.

Figure 5:
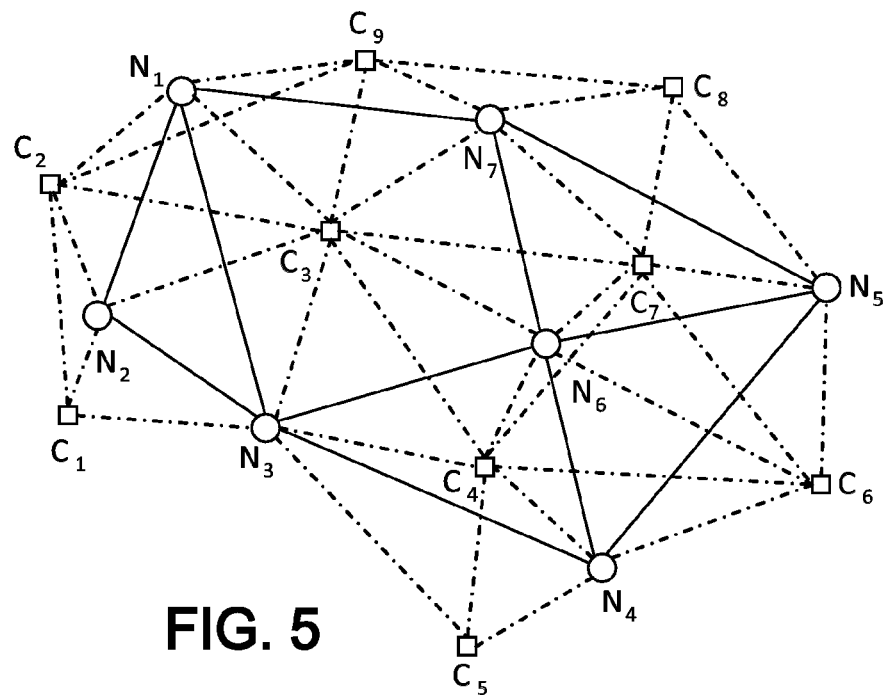
FIG. 5 shows an example of a part of a multihop network comprising a routing system according to a second embodiment of the invention.
Figure 6:
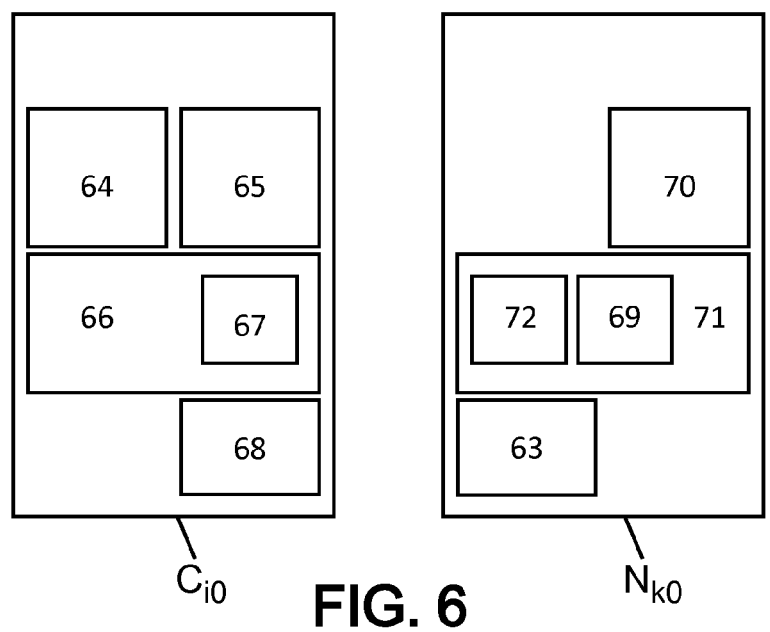
FIG. 6 shows an example of a routing system according to the second embodiment of the invention.

FIGS. 5 and 6 relate to a second embodiment of the invention, in which an example of a network of sensors $C_1 \ldots, C_9$ is used.

Such networks of sensors are known, for example used for the measurement of the temperature or the quality of air.

In such an embodiment, nodes and sensors are for example part of the same multihop network but are no longer directly connected.

A sensor $C_{i0}$ and a node $N_{k0}$ are shown in FIG. 6. The distance between this sensor $C_{i0}$ and this node $N_{k0}$ is not known a priori, and could be estimated directly for example by a radiofrequency identification technique (RFID). However, in this second embodiment, the nodes $N_{k0}$ and the sensors $C_{i0}$ all have location means 70, 65 capable of determining their own position.

The sensor $C_{i0}$ comprises an electric and/or magnetic field measuring device 64, connected to the routing component 66. The component 66 comprises a component 67 arranged to format the control messages according to the structure $S_i =$ [$ID_i$, $Loc_i$, $Val_i$), $ID_i$ being an identifier of the sensor $C_i$, i indicating the sensors, $Loc_i$ being the coordinates of the sensor $C_i$ received from the means 65, and $Val_i$ being a structure containing a series of $q_i$ measurements of pairs (E, B) for the set of the $q_i$ frequency bands observed by the means 64 of the sensor $C_i$:

$$Val_i = \{(BF_{i,1}, E_{i,1}, B_{i,1}), (BF_{i,2}, E_{i,2}, B_{i,2}), \ldots, (BF_{i,qi}, E_{i,qi}, B_{i,qi})\},$$

these $q_i$ frequency bands observed by the sensor $C_i$ being indexed by q varying from 1 to $q_i$, The sensor $C_{i0}$ includes moreover an interface 68 for communication with the nodes. The sensor $C_{i0}$ can periodically broadcast, in its one-hop neighbourhood, the E and B field measurements according for example to the multihop routing protocol, such that these measurements are included in the control message to the one-hop neighbouring nodes. Alternatively, the measurements can be sent in another type of control message supported by the routing protocol of the multihop network, or also in an extension of a standard control message, for example a message of the HELLO type.

The node $N_{k0}$ or N comprises a communication interface 63 for communicating with the other nodes and the sensors.

In this second embodiment, the node $N_{k0}$ comprises means of evaluation 69 of the field in the neighbourhood of the node $N_{k0}$. These means 69 are connected to the location means 70 and to the interface 63 in order to receive as input:

The coordinates $Loc_N$ of the node $N_{k0}$,

The list of the r frequency bands ($BF_{N,1}, BF_{N,2}, \ldots, BF_{N,r}$) considered by the node $N_{k0}$, these r frequency bands being indexed by j varying from 1 to r, For each one-hop neighbouring sensor $C_i$ of the node $N_{k0}$, a structure $S_i$ containing the coordinates $Loc_i$ of the sensor, and $Val_i$, the set of pairs ($E_{i,q}, B_{i,q}$) measured in the $q_i$ different frequency bands observed by the sensor $C_i$.

The means 69 make it possible to evaluate a field value in the neighbourhood of the node $N_{k0}$, and to do this for each one of the frequency bands observed for the node $N_{k0}$. The means 69 apply criteria described in detail below in order to select the measurements used during the evaluation of the field value in the neighbourhood of the node $N_{k0}$.

If the node $N_{k0}$ does not have a neighbouring one-hop sensor having previously sent a valid structure $S_i$ to the node $N_{k0}$, or also if the frequency band $BF_{N,j}$ is not included in at least one of the frequency bands observed by the sensors $C_i$ neighbouring node $N_{k0}$ by one hop and having sent a valid a structure $S_i$, then the node $N_{k0}$ assigns a default EMFC metric value for this frequency band $BF_{N,j}$ $$EMFC(N, BF_{N,j}) = EMFC\_DEFAULT(BF_{N,j}).$$

This default value can be fixed for example at 1. Thus, in the absence of information relative to the electromagnetic fields at the level of the node $N_{k0}$ for the frequency band $BF_{N,j}$, the most unfavourable value of metric EMFC is assigned, but within the limits of the authorized values. The node $N_{k0}$, even though penalized by this default EMFC metric value, subsequently remains selectable as a transit node.

It is possible to assign to $EMFC\_DEFAULT(BF_{N,j})$ a value strictly lower than 1. The node is then not subsequently selected as an intermediate node of a path for routing data packets.

Finally, it is also possible to decide to assign to $EMFC\_DEFAULT(BF_{N,j})$ a value strictly higher than 1; the node $N_{k0}$ can then be subsequently chosen by priority as a transit node, with respect to a node whose electromagnetic conditions would result in a truly evaluated EMFC metric of 1.

If the node $N_{k0}$ has at least one one-hop neighbouring sensor having previously sent to it a valid $S_i$ structure and if the frequency band $BF_{N,j}$ is included in at least one of the frequency bands observed by the sensors $C_i$ neighbouring the node $N_{k0}$ by one hop and having sent a valid $S_i$ structure, then the set of triplets $BF_{i,q}, E_{i,q}, B_{i,q})$ is considered, representing, for the set G of the sensors $C_i$ neighbouring the node $N_{k0}$, by one hop, the conditions ($E_{i,q}, B_{i,q}$) measured by the sensor Ci in the frequency band $BF_{i,q}$, the latter having to satisfy $BF_{N,j} \subset BF_{i,q}$.

The pair ($ID_i, Loc_i$) is also considered, making it possible for the node to locate the sensor $C_i$ and to deduce, from its own coordinates $Loc_N$, the distance $d_i$ separating this node $N_{k0}$ from the sensor $C_i$.

If, for all the sensors of the set G, this distance $d_i$ is greater than a defined threshold $d_0$, then it is considered that there is no sensor $C_i$ neighbouring the node $N_{k0}$ by one hop that is sufficiently close to the latter for taking into account the values measured by this sensor $C_i$. The node therefore assigns the default EMFC value for this frequency band $BF_{N,j}$.

In the contrary case, it is considered that it is possible to deduce an EMFC value ($N_j, BF_{N,j}$) for the node $N_{k0}$ from the set of values ($E_{i,q}, B_{i,q}$) of the sensors $C_i$ belonging to the set G and sufficiently close to the node $N_{k0}$. The taking into account of these values can moreover be weighted by the distances $d_i < d_o$ separating these sensors $C_i$ from the node $N_{k0}$.

The EMFC value ($N_j, BF_{N,j}$) can be estimated using methods known to a person skilled in the art.

For example, for each frequency band $BF_{N,j}$ for which there are value measurements ($E_{i,q}, B_{i,q}$), a distance $D_j$, corresponding to the wavelength of the lowest frequency of the frequency band $BF_{N,j}$ is estimated. For example, in the frequency band $BF_{N,j} = [2400$ MHz; $2483.5$ MHz], $$D_j = T_0 \cdot \frac{c}{2,4 \cdot 10^9}$$

with $T_0 = 1$ s and $c = 3.10^8$ m/s, giving $D_j = 12.5$ cm.

For each sensor whose measurements are taken into account for evaluating the value of the electric field in the neighbourhood of the node $N_{k0}$, it is sought to estimate the intensity of the electric field $E_{i,j,max}$ at the distance $D_j$, assuming that the field $E_{i,q}$ measured by the sensor $C_i$ in the frequency band $BF_{N,j}$ is exclusively produced by a radio transmission source situated at the coordinates of the node $N_{k0}$.

If $D_j \geq d_i$, $$E_{i,j,max} = \frac{D_j}{d_i} \cdot E_{i,q}$$

is estimated.

In the contrary case, it is considered that the distances are too small in comparison with the expected precision, and the value of $E_{i,j,max}$ is fixed arbitrarily at $$E_{i,j,max} = \min\left(E_{i,q}, \frac{\sqrt{30 \cdot P_0}}{D_j}\right),$$

where $P_0$ is the apparent maximum power radiated by an isotropic antenna situated at the coordinates of the node $N_{k0}$, in the frequency band $BF_{N,j}$.

When the set of the $E_{i,j,max}$ values has been estimated for the distance $D_j$, the highest value of the $E_{i,j,max}$ values is chosen as the value $E_j$.

Provision can be made for the component 69 simply to return the pair ($E_j$, 0). In fact, it can be considered that an estimation of $E_j$ is sufficient and that it is not necessary or useful to estimate $B_j$. The subsequent estimation of the EMFC metric ($N_j$, $BF_{N,j}$) carried out in the means of estimation 72 is then carried out with only the electric field intensity values estimated at the distances $D_j$, according to the method illustrated in FIG. 3.

The node $N_{k0}$ includes a multihop routing component 71, of the same type as the component 5 in the FIG. 2.

Figure 7:
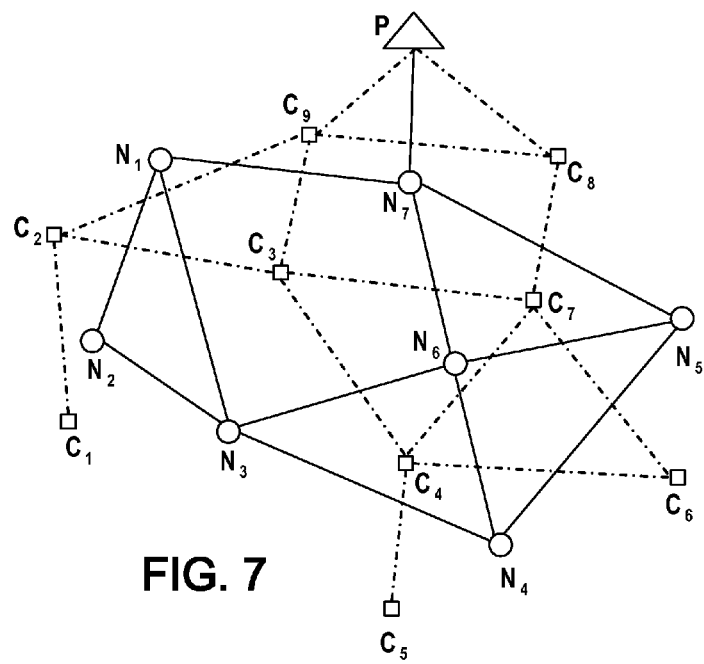
FIG. 7 shows an example of a part of a multihop network comprising a routing system according to a third embodiment of the invention.
Figure 8:
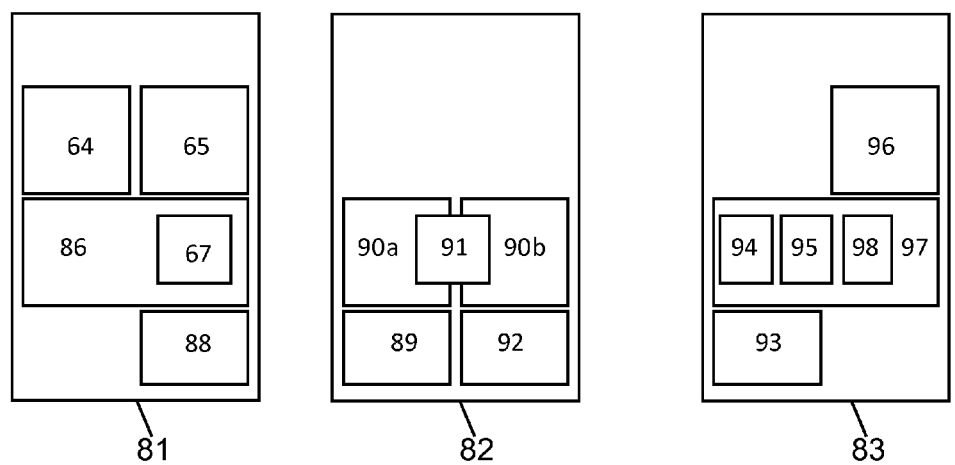
FIG. 8 shows an example of a routing system according to the third embodiment of the invention.

FIGS. 7 and 8 relate to a third embodiment using an example of a network of sensors $C_1 \ldots, C_9$, an example of a multihop network comprising the nodes $N_1 \ldots, N_7$, and an example of a gateway device P providing the interconnection between these two networks. A sensor 81, a node 83 and a gateway device 82 or P are shown in FIG. 8.

The sensor 81 can be of the same type as the sensor $C_{i0}$ described with reference to FIG. 6, except that the sensors are arranged for communicating with the gateway P. The packets transmitted by the sensors $C_1 \ldots, C_9$ thus pass through the gateway P before being broadcast in the network of the nodes $N_1 \ldots, N_7$. The sensor 81 can thus include a routing component 86 arranged for broadcasting to the gateway 82 structures defined by a component 67 substantially similar to the component 67 of FIG. 6. The sensor 81 can include a communication interface 88 identical to, or different from, a communication interface 93 of the nodes.

The node 83 comprises locating means 96 for estimating its own position, a multihop routing component 97 and the communication interface 93.

The multihop routing component 97 comprises a component 94 arranged for selectively retrieving information broadcast from the sensors.

The multihop routing component 97 comprises means 98 of obtaining an electric and/or magnetic field value in the neighbourhood of the node 83. These means 98 are connected to the component 94 and can be arranged in the same way as the means 69 of the FIG. 6.

Optionally, It is possible to provide a component for broadcasting locations of the nodes 95, allowing the gateway 82 to broadcast a structure S coming from a sensor to only one or more nodes considered sufficiently close to this sensor.

The gateway 82 comprises a collecting component 90a for collecting the control messages coming from the sensors, and a broadcasting component 90b for broadcasting these control messages in the network of the nodes.

Optionally, it is possible to provide a component 91 capable of using the information on the location of the structures $S_i$ coming from the sensors. In fact, the default behaviour of the component 90b consists in broadcasting the structures $S_i$ by flooding the network of the nodes. When the optional component 95 of the nodes is also used, the gateway 82 can have knowledge of the positions of the nodes $N_1$, $N_2, \ldots, N_7$. The component 91 can provide a geographic routing extension allowing the gateway 82 to broadcast a structure $S_i$ towards only the node or nodes close to the coordinates of the sensor $C_i$ indicated in the structure $S_i$. The activation of these components 91, 95 therefore makes it possible to aim for a saving in terms of signalling costs in the network of the nodes.

Of course, the gateway 82 includes an interface for communication with the network of sensors 89 and an interface for communication with the network of nodes 92.

Figure 9:
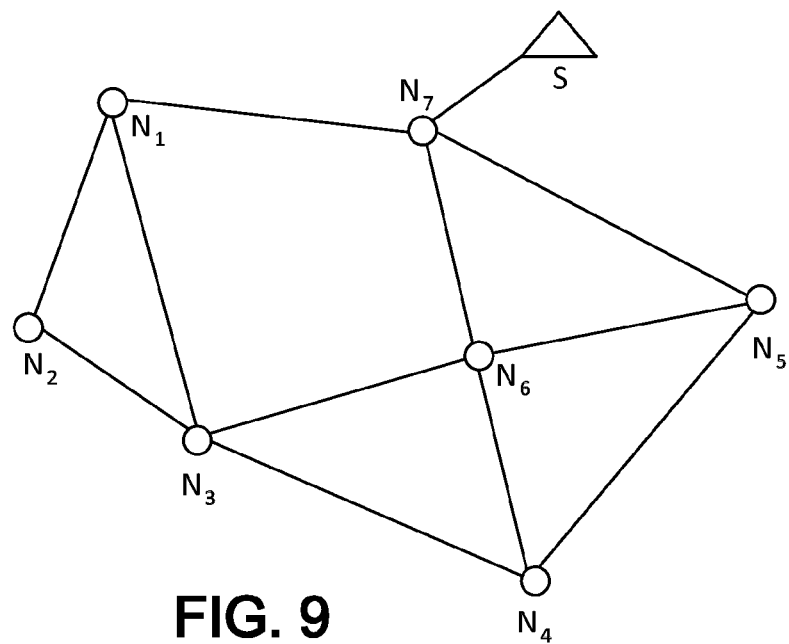
FIG. 9 shows an example of a part of a multihop network comprising a routing system according to a fourth embodiment of the invention.
Figure 10:
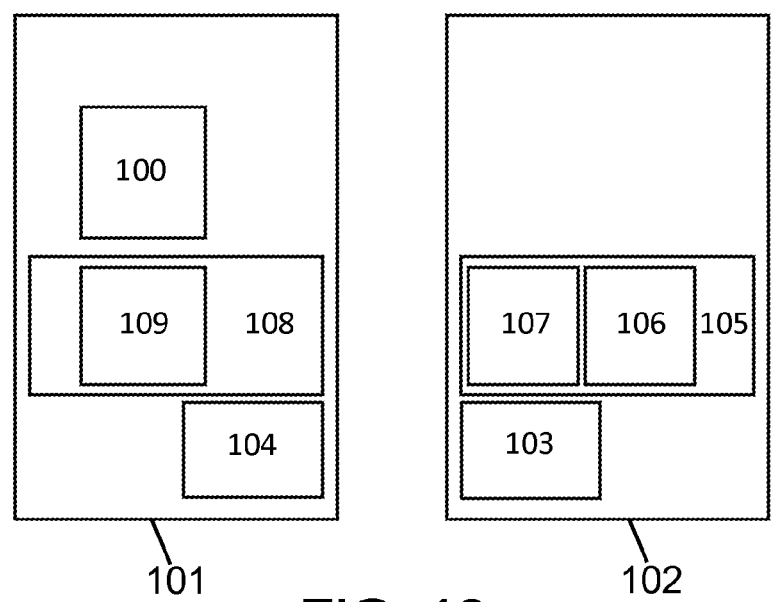
FIG. 10 shows an example of a routing system according to the fourth embodiment of the invention.

FIGS. 9 and 10 relate to a fourth embodiment, in which the electromagnetic field value is predicted from contextual parameters. A node S of the multihop network hosts an application server for estimation of electromagnetic interference. The network of FIG. 9 is therefore a network without an electromagnetic field sensor.

This server, referenced 101 in FIG. 10, comprises means of prediction 100, for planning over the course to time an assignation of metric values for taking into account the EMFC electromagnetic field surrounding a sub-set SE of the set of nodes of the network of nodes. In particular, this server 101 makes it possible to generate, at various times t scheduled by a user of the application function, for each node N of the sub-set SE: $U_N(t) = \{(BF_{N,1}, c_t(N, BF_{N,1})), (BF_{N,2}, c_t(N, BF_{N,2})), \ldots, (BF_{N,r}, c_t(N, BF_{N,r}))\}$, $c_t(N, BF_{N,j})$, with j varying from 1 to r, representing a predicted value of the EMFC metric intended for the node N, in the frequency band $BF_{N,j}$.

The means of prediction produce electromagnetic field predictions, for example using as a basis measurements made in the past, on information on expected events, for example the switching off of the computers in an office building at night, or also information transmitted by a another device. For example, the number of computers still switched on can be provided by a server of the office building.

These prediction means 100 can be arranged to carry out this planning in various ways. For example, rules can be defined prior to the installation, or during the installation of the component 100 on the site of deployment of the network, by a supplier (for example a constructor or an operator) or also by a service provider (for example an electrician approved by the supplier).

According to another example, the rules can be directly defined by the final user of the network, for example an individual if it is a domestic network, or a data processing or electrical systems manager if it is a hospital system, by means of an appropriate man/machine interface. It can for example be a graphical interface directly accessible on the component 100 if the latter is used on a terminal having a screen. It can also be a Web interface allowing the final user, having access rights to this interface, remote access to the component 100, from an appropriate terminal.

It is also possible to provide for the planning rules to be downloaded, in particular for updating purposes.

These rules can be updated automatically by an external system, which can be a home automation system, existing at the place where the network is deployed. For example, if the home automation system switches on electric underfloor heating at a given time in an area covered by the network, the rules of the component 100 could advantageously be updated by the home automation system, in such a way as to take account of the electromagnetic interference generated by the newly started radio-electric device.

The server 101 comprises a routing component 108 comprising means of generation of messages 109 arranged for inserting the structures $U_N(t)$ in control messages intended for the node N.

The server 101 comprises moreover a communication interface 104 for sending and receiving data to and from the nodes. The node 102, for example a mobile terminal, comprises the routing component 105, arranged for taking into account a metric called the taking into account of the surrounding EMFC electromagnetic field metric.

This metric is predicted by the means 100 of the server 101.

The routing component 105 comprises means 107 of recognition of the control messages coming from the server 101. The recognition means 107 are arranged to extract the structures $U_N(t)$ from the control messages received, and to transmit them to the means 106 of taking into account of metrics $c_t$. The node 102 has moreover a communication interface 103 for exchanging data with the other nodes of the network, in particular the node S.

The invention claimed is:

1. A method for routing in a multihop network, comprising, for at least one node of the multihop network, the following steps:
   a/ measuring a value of an intensity of an electromagnetic field over all of a frequency band, the electromagnetic field comprising signals attributable to messages transmitted in the multihop network and signals attributable to an electromagnetic environment of a neighborhood of the at least one node originating from outside the multihop network, said neighborhood comprising all nodes only one hop away from the at least one node, the frequency band comprising first frequencies relating to operating frequencies of the multihop network and second frequencies differing from said first frequencies, in the neighborhood of the at least one node,
   b/ determining, using a computer processor, a ratio between said measured value and a predefined maximum electromagnetic field threshold value over said frequency band, and
   c/ based on said ratio, selecting the at least one node as at least one routing node for at least one message in the multihop network so that the value of the intensity of the electromagnetic field at said at least one node does not exceed said predefined maximum electromagnetic field threshold value.

2. The method according to claim 1, comprising, during the step a/,
   receiving, for at least one remote sensor, a measurement of the intensity of the electromagnetic field in a neighborhood of said sensor,
   and
   evaluating the value of the intensity of the electromagnetic field in the neighborhood of the at least one node from the received measurement for each of the at least one remote sensor.

3. The method according to claim 2, wherein, for at least one remote sensor, the measurement of the intensity of the electromagnetic field in the neighborhood of the at least one remote sensor is received directly from at least one remote sensor.

4. The method according to claim 2, wherein, for at least one remote sensor, the measurement of the intensity of the electromagnetic field in the neighborhood of at least one remote sensor is received from a gateway device.

5. The method according to claim 2, further comprising, during the step a/,
   receiving a plurality of measurements of the intensity of the electromagnetic field in the neighborhood of a plurality of respective sensors,
   selecting, from said plurality of received measurements, measurements corresponding to sensors situated at a predetermined maximum distance from the at least one node, and
   obtaining the value of the intensity of the electromagnetic field in the neighborhood of the at least one node from the selected measurements.

6. The method according to claim 1, further comprising, in step a/,
   predicting the value of the intensity of the electromagnetic field in the neighborhood of the at least one node from at least one contextual parameter.

7. The method according to claim 1, further comprising estimating a metric value from:
   the ratio determined in step b/;
   a previously determined ratio in step b/, and
wherein
   during the step c/, said metric value is used for deciding whether or not said node can be selected as a routing node for at least one message in the multihop network.

8. The method according to claim 7, wherein the metric value is estimated as follows:

$$c_t = \frac{1}{\alpha \cdot M_t + (1-\alpha) \cdot M_{t-1}},$$

where $c_t$ is the metric value, $0 < \alpha \le 1$, $$M_t = \max\left(\frac{E_t}{E_M}, \frac{B_t}{B_M}\right), \text{ and } M_{t-1} = \max\left(\frac{E_{t-1}}{E_M}, \frac{B_{t-1}}{B_M}\right)$$

where $E_M$ and $B_M$ are predetermined values,
$E_t$ is an electric field intensity value obtained in step a/, and
$E_{t-1}$ is a previously obtained electric field intensity value,
$B_t$ is a magnetic field intensity value obtained in step a/, and
$B_{t-1}$ is a previously obtained magnetic field intensity value.

9. The method according to claim 7, wherein the ratio determined in step b/ and denoted $M_t$ is determined as follows:

$$M_t = \max\left(\frac{E_t}{E_M}, \frac{B_t}{B_M}\right), \text{ and } M_{t-1} = \max\left(\frac{E_{t-1}}{E_M}, \frac{B_{t-1}}{B_M}\right)$$

where $E_M$ and $B_M$ are predetermined values,
$E_t$ is an electric field intensity value measured in step a/,
$E_{t-1}$ is a previously measured electric field intensity value,
$B_t$ is a magnetic field intensity value measured in step a/, and
$B_{t-1}$ is a previously measured magnetic field intensity value.

10. The method according to claim 7, further comprising:
  determining, for each candidate route of a set of candidate routes, comprising at least one node, a route parameter as a result of an adding operation on metric values of the nodes of said candidate route; and
  choosing a route from among the candidate routes for which the route parameter thus determined is the highest.

11. A routing system for a multihop network comprising a plurality of nodes, said system comprising at least one computer configured to:
  measure a value of an intensity of an electromagnetic field value over all of a frequency band, the electromagnetic field comprising signals attributable to messages transmitted in the multihop network and signals attributable to an electromagnetic environment of a neighborhood of at least one node originating from outside the multihop network, said neighborhood comprising all nodes only one hop away from the at least one node, the frequency band comprising first frequencies relating to operating frequencies of the multihop network and second frequencies differing from said first frequencies, in a neighborhood of the at least one node,
  determine a ratio between said measured value and a predefined maximum electromagnetic field threshold value over said frequency band, and
  select a route based on the determined ratio for deciding whether or not said at least one node can be selected as a routing node for at least one message in the multihop network so that the value of the intensity of the electromagnetic field at said at least one node does not exceed said predefined maximum electromagnetic field threshold value.

12. A node for a multihop network comprising a plurality of nodes, said node further comprising at least one computer configured to:
  measure a value of an intensity of an electromagnetic field value over all of a frequency band, the electromagnetic field comprising signals attributable to messages transmitted in the multihop network and signals attributable to an electromagnetic environment of a neighborhood of said node originating from outside the multihop network, said neighborhood comprising all nodes only one hop away from said node, the frequency band comprising first frequencies relating to operating frequencies of the multihop network and second frequencies differing from said first frequencies, in said neighborhood of said node, and
  determine a ratio between said measured value and a predefined maximum electromagnetic field threshold value over said frequency band, and
  select a route based on the determined ratio for deciding whether or not said node can be selected as a routing node for at least one message in the multihop network so that the value of the intensity of the electromagnetic field at said node does not exceed said predefined maximum electromagnetic field threshold value.

13. The method of claim 12 wherein the node is a communication terminal of the multihop network.

14. An article of manufacture including computer readable media with instructions encoded and stored thereon, the stored instructions, when executed causes a processor to perform the steps of:
  measuring a value of an intensity of an electromagnetic field value over all of a frequency band, the electromagnetic field comprising signals attributable to messages transmitted in a multihop network and signals attributable to an electromagnetic environment of a neighborhood of at least one node of the multihop network originating from outside the multihop network, said neighborhood comprising all nodes only one hop away from the at least one node, the frequency band comprising first frequencies relating to operating frequencies of the multihop network and second frequencies differing from said first frequencies, in said neighborhood of said at least one node,
  determining, using a computer processor, a ratio between said measured value and a predefined maximum electromagnetic field threshold value over said frequency band, and
  based on said ratio, selecting said at least one node as a routing node for at least one message in the multihop network so that the value of the intensity of the electromagnetic field at said at least one node does not exceed said predefined maximum electromagnetic field threshold value.

15. A method for routing in a multihop network, comprising, for at least one node of the multihop network, the following steps:
  a/ measuring a value of an intensity of an electromagnetic field value in a neighborhood of the at least one node;
  b/ determining, using a computer processor, a ratio between said measured value and a predefined electromagnetic field threshold value;
  c/ based on said ratio, selecting the at least one node as at least one routing node for at least one message in the multihop network;
  estimating a metric value from:
    the value of the electromagnetic field measured in step a/;
    a previously measured value of the electromagnetic field; and
    the predefined electromagnetic field threshold value; and
  wherein:
    during the step c/, said metric value is used for deciding whether or not said node can be selected as a routing node for at least one message in the multihop network; and
    the metric value is estimated as follows:

$$c_t = \frac{1}{\alpha \cdot M_t + (1-\alpha) \cdot M_{t-1}},$$

where ct is the metric value, $0 < \alpha \leq 1$, $$M_t = \max\left(\frac{E_t}{E_M}, \frac{B_t}{B_M}\right), \text{ and } M_{t-1} = \max\left(\frac{E_{t-1}}{E_M}, \frac{B_{t-1}}{B_M}\right)$$

where $E_M$ and $B_M$ are predetermined values,
$E_t$ is an electric field value obtained in step a/, and
$E_{t-1}$ is a previously obtained electric field value,
$B_t$ is a magnetic field value obtained in step a/, and
$B_{t-1}$ is a previously obtained magnetic field value.

* * * * *